(12) United States Patent
Zhang et al.

(10) Patent No.: US 11,526,437 B1
(45) Date of Patent: Dec. 13, 2022

(54) HEAP SPACE MANAGEMENT

(71) Applicant: International Business Machines Corporation, Armonk, NY (US)

(72) Inventors: Gan Zhang, Beijing (CN); Xing Xing Shen, Beijing (CN); Shan Gao, Beijing (CN); Le Chang, Beijing (CN); Ming Lei Zhang, Beijing (CN); Zeng Yu Peng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 17/345,142

(22) Filed: Jun. 11, 2021

(51) Int. Cl.
*G06F 12/02* (2006.01)
*G06F 12/0875* (2016.01)

(52) U.S. Cl.
CPC ...... *G06F 12/0253* (2013.01); *G06F 12/0875* (2013.01)

(58) Field of Classification Search
None
See application file for complete search history.

(56) References Cited

U.S. PATENT DOCUMENTS

| | | | |
|---|---|---|---|
| 9,448,928 B2 | 9/2016 | Ahad et al. | |
| 2012/0331018 A1* | 12/2012 | Khanna | G06F 12/0253 707/813 |
| 2014/0143516 A1* | 5/2014 | Dawson | G06F 3/0629 711/171 |
| 2014/0324924 A1* | 10/2014 | Ahad | G06F 12/0253 707/813 |
| 2016/0026392 A1* | 1/2016 | Harris | G06F 3/0673 711/171 |
| 2018/0046573 A1* | 2/2018 | Bobroff | G06F 12/0253 |
| 2020/0102704 A1 | 4/2020 | Guniguntala et al. | |
| 2021/0357139 A1* | 11/2021 | Reynolds | G06F 3/0604 |

OTHER PUBLICATIONS

Beckwith, M., "Garbage First Garbage Collector Tuning," https://www.oracle.com/technical-resources/articles/java/g1gc.html, printed Apr. 29, 2021, 9 pgs.
IBM, "5.3.2 IBM J9 JVM," http://www.setgetweb.com/p/WAS61/ae/aix/5-3-2.htm, printed Apr. 29, 2021, 4 pgs.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Tracy C Chan
(74) *Attorney, Agent, or Firm* — Kelli D. Morin

(57) ABSTRACT

A method for heap space management includes, in response to a determination that consumption of a first heap space of an application exceeds a first threshold, determining whether a second heap space of the application after garbage collection is sufficient to accommodate data stored in the first heap space. The method further includes, in response to a determination that the second heap space after the garbage collection is sufficient to accommodate the data, performing the garbage collection on the second heap space. The method further includes storing the data into the second heap space.

20 Claims, 8 Drawing Sheets

HEAP SPACE MANAGEMENT

BACKGROUND

The present disclosure relates to storage management, and more specifically, to a method, system, and computer program product for heap space management.

With the development of information technology, the stability of computing systems becomes critical. However, "out of memory" issues still occur in a variety of scenarios, such as when using the Java Development Kit (JDK). Some of the out of memory issues are caused by a lack of heap space. Even if there is still enough native memory in the process address space, a lack of heap space may lead to the out of memory exception. As a consequence, the application may crash, degrading the user experience. However, traditional heap space management is inefficient in dealing with such issues.

SUMMARY

According to one embodiment of the present disclosure, there is provided a computer-implemented method. The method includes, in response to a determination that consumption of a first heap space of an application exceeds a first threshold, determining whether a second heap space of the application after garbage collection is sufficient to accommodate data stored in the first heap space. The method further includes, in response to a determination that the second heap space after the garbage collection is sufficient to accommodate the data, performing the garbage collection on the second heap space. The method further includes storing the data into the second heap space.

According to another embodiment of the present disclosure, there is provided a system. The system includes a processing unit and a memory coupled to the processing unit and storing instructions thereon. The instructions, when executed by the processing unit, performing a method. The method includes, in response to a determination that consumption of a first heap space of an application exceeds a first threshold, determining whether a second heap space of the application after garbage collection is sufficient to accommodate data stored in the first heap space. The method further includes, in response to a determination that the second heap space after the garbage collection is sufficient to accommodate the data, performing the garbage collection on the second heap space. The method further includes storing the data into the second heap space.

According to yet another embodiment of the present disclosure, there is provided a computer program product comprising a computer-readable storage medium having program instructions embodied therewith. The program instructions are executable by a processor to cause the processor to perform a method. The method includes, in response to a determination that consumption of a first heap space of an application exceeds a first threshold, determining whether a second heap space of the application after garbage collection is sufficient to accommodate data stored in the first heap space. The method further includes, in response to a determination that the second heap space after the garbage collection is sufficient to accommodate the data, performing the garbage collection on the second heap space. The method further includes storing the data into the second heap space.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Figure 1:
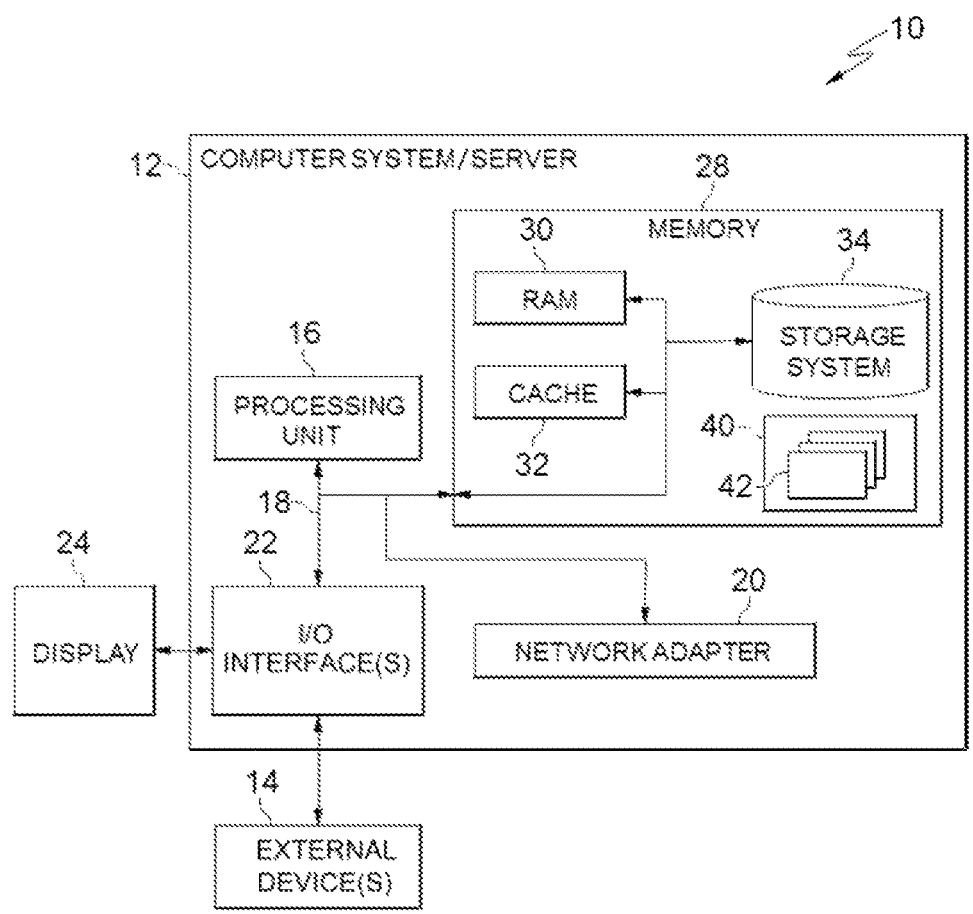
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
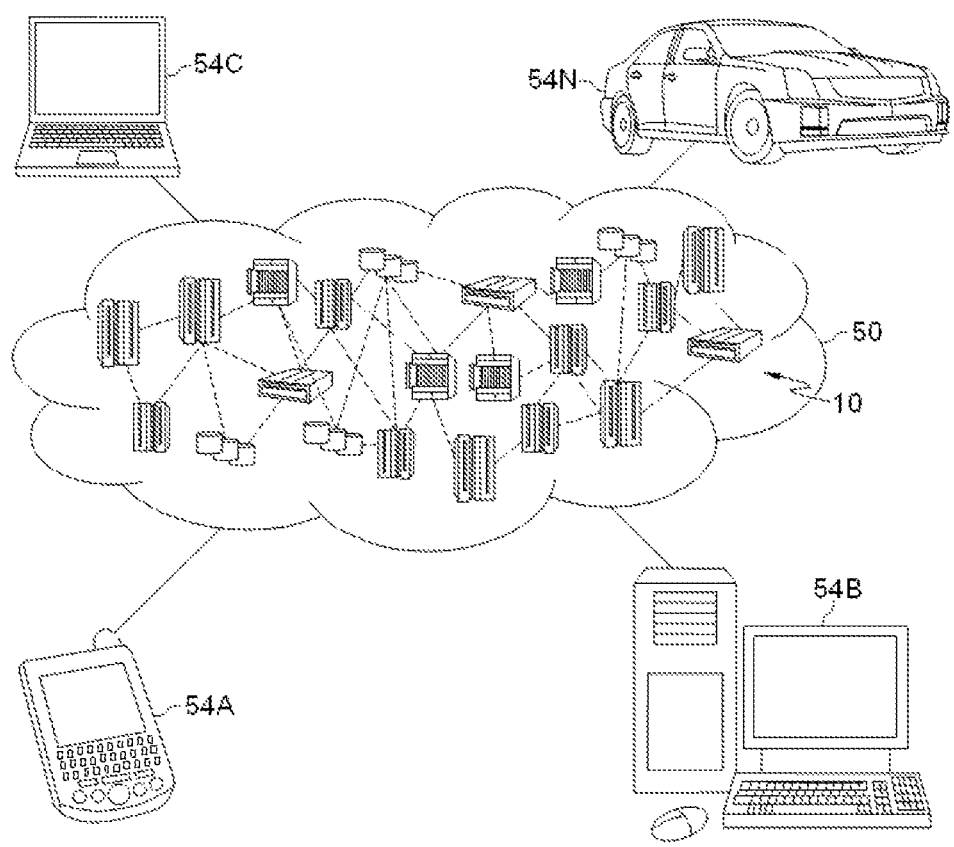
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
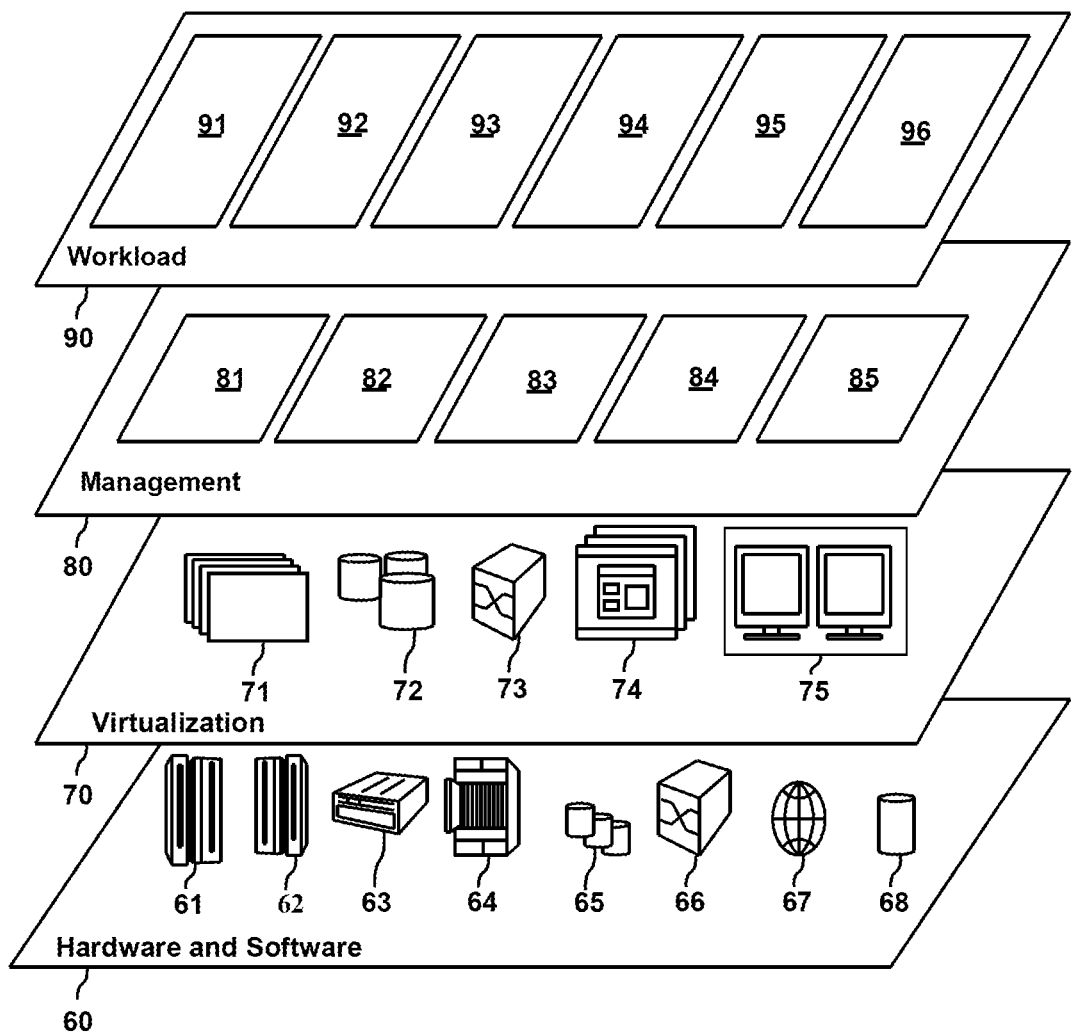
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and heap space management 96.

As described above, out of memory issues occur in a variety of scenarios, such as when using the JDK. Some of the out of memory issues are caused by the lack of heap space. However, traditional heap space management is inefficient in dealing with these issues.

An improved solution for heap space management is provided in the present disclosure. Generally speaking, according to embodiments of the present disclosure, if consumption of a first heap space of an application exceeds a first threshold, whether a second heap space of the application after garbage collection is sufficient to accommodate data stored in the first heap space will be determined. If the second heap space after the garbage collection is sufficient to accommodate the data, the garbage collection on the second heap space will be performed, and the data will be stored into the second heap space.

In accordance with the heap space management as proposed herein, efficient use of memory space can be achieved.

Figure 4:
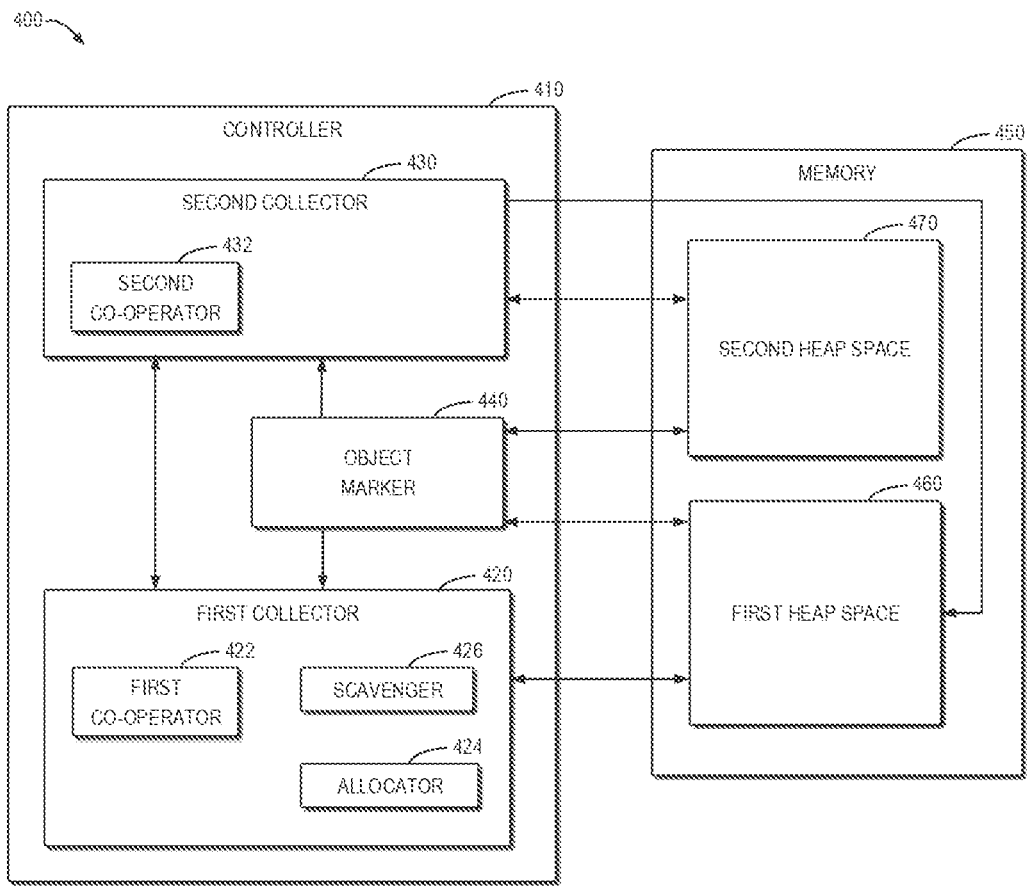
FIG. 4 depicts a schematic diagram of an example of a heap space management environment in which an embodiment of the present invention can be implemented.

Now some example embodiments will be described with reference to FIGS. 4-8. FIG. 4 depicts a schematic diagram of an example of a heap space management environment 400 in which an embodiment of the present disclosure can be implemented.

The heap space management environment 400 may include a controller 410 and a memory 450. In some embodiments, the memory 450 may be a native memory. The controller 410 may be implemented in the computer system/server 12 of FIG. 1, and may manage heap spaces of the memory 450 for applications.

For example, the memory 450 may include a first heap space 460 and a second heap space 470. The second heap space 470 may be the heap space originally allocated to an application, and may be treated as the main heap space for the application. The first heap space 460 may be an extra heap space requested for the application after object allocation failure of the second heap space 470 occurs.

Accordingly, the controller 410 may include two separate collectors for managing the first and second heap spaces 460 and 470, respectively. More specifically, the first collector 420 may be used to manage the first heap space 460, and the second collector 430 may be used to manage the second heap space 470. Since the second heap space 470 is the main heap space, the second collector 430 may be treated as the main collector.

In some embodiments, the first and second collectors 420 and 430 may include first and second co-operators 422 and 432, respectively. The first and second co-operators 422 and 432 may facilitate the collaboration of the first and second collectors 420 and 430.

In addition, the first collector 420 may also include a scavenger 426 for performing garbage collection on the first heap space 460, and an allocator 424 for allocating objects to the first heap space 460.

In the heap space management, initially, the second collector 430 manages the second heap space 470 for the application, while the first collector 420 and the first heap space 460 have not been created yet. With the running of the application, storage resources in the second heap space 470 may be consumed. When the consumption of the second heap space 470 exceeds a predetermined threshold, for example when all the available heap space is consumed, the object allocation failure will occur. In this case, the second collector 430 may perform garbage collection on the second heap space 470.

However, in some embodiments, the second heap space 470 after the garbage collection still cannot satisfy the further storage requirement. In such embodiments, the second collector 430 may need to request extra heap space.

In this case, in some embodiments, the second collector 430 may determine whether consumption of the second heap space 470 after the garbage collection exceeds a second threshold, such as 80% of the second heap space 470. If the consumption of the second heap space 470 exceeds the second threshold, the second collector 430 may allocate the first heap space 460 for the application.

In some embodiments, the second collector 430 may determine whether an amount of storage resources being requested for allocation of the first heap space 460 exceeds a threshold amount. For example, the amount of storage resources may be determined based on the customer setting, such as 20% of the second heap space 470.

In addition, the threshold amount may be determined based on a variety of factors. In some embodiments, the threshold amount may be determined based on the customer setting. In addition, in some embodiments, threshold amount may take into account the remaining space in the memory 450 that can be used for allocation of extra heap space. For example, the remaining space in the memory 450 is 100Gb, in which only 40Gb can be used for allocation of extra heap space. In this case, the first heap space 460 should not exceed 40Gb. Thus, the threshold amount is 40Gb.

Moreover, in some embodiments, the threshold amount may take into account the remaining heap space available for the customer or the application. For example, there may be a max limit for the heap space of the customer or the application, such as 64Gb. If the second heap space 470 is 54Gb, the remaining heap space available for the customer or the application is 10Gb. In this case, the first heap space 460 should not exceed 10Gb. Thus, the threshold amount is 10Gb.

If the amount of storage resources does not exceed the threshold amount, the second collector 430 may allocate the amount of storage resources for the first heap space 460. Thereby, the second collector 430 may also create the first collector 420 for managing the first heap space 460.

In this way, the application will survive from consumption exceeding the max heap space and avoid the out of memory issues and the crashes on the applications, such as Java applications. In addition, since the extra heap space is in the native memory, paging efficiency can also be improved.

Otherwise, if the amount of storage resources exceeds the threshold amount, the second collector 430 may reduce the amount of storage resources. For example, the second collector 430 may halve the amount of storage resources, such as to 10% of the second heap space 470. In this case, the second collector 430 may allocate the reduced amount of storage resources for the first heap space 460.

In some embodiments, if the reduced amount of storage resources still exceeds the threshold amount, the second collector 430 may iteratively reduce the amount of storage resources, until the reduced amount of storage resources is below the threshold amount. Alternatively, if the reduced amount of storage resources still exceeds the threshold amount, the second collector 430 may raise an out of memory error.

Figure 5:
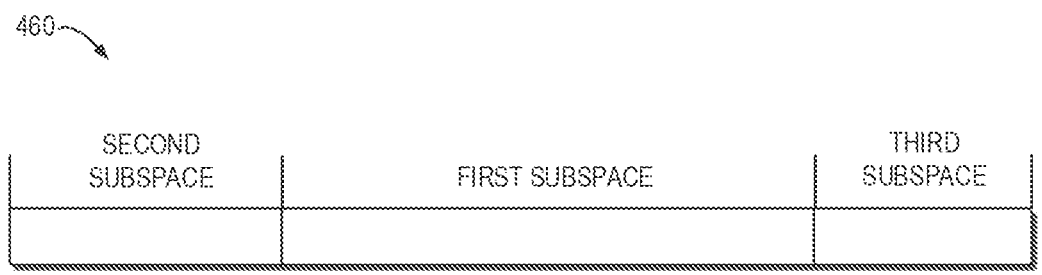
FIG. 5 depicts a schematic diagram of an example of first heap space according to an embodiment of the present invention.

For the newly allocated first heap space 460, FIG. 5 depicts a schematic diagram of an example of the first heap space 460 according to an embodiment of the present invention. As shown in FIG. 5, the first heap space 460 can be split into at least two parts, that is, the first subspace and the second subspace. The first subspace can be used to store the data. For example, the first subspace can be used to store the objects allocated to the first heap space 460. The second subspace can be used as the spare heap space for garbage collection. In this case, the objects allocated to the first heap space 460 will not be stored in the second subspace. In addition, in some embodiments, the first heap space 460 may also include a third subspace for storing management data of the first heap space 460.

Returning to FIG. 4, the first and second co-operators 422 and 432 may facilitate the co-operation of the management of the first heap space 460 by the first collector 420 and the management of the second heap space 470 by the second collector 430. Due to such co-operation, any new object allocation request will be assigned to the first collector 420 after the allocation of the first heap space 460. In this case, the new objects will be allocated and stored into the first heap space 460 by the allocator 424.

While the application is running, storage resources in the first heap space 460 may be consumed, and the object allocation failure of the first heap space 460 may also occur. In some embodiments, the first collector 420 may determine whether consumption of the first heap space 460 exceeds the first threshold. If the consumption of the first heap space 460 exceeds the first threshold, the object allocation failure may occur.

The object allocation failure may trigger the object marker 440 to perform a garbage collection mark process on the first and second heap spaces 460 and 470. In the garbage collection mark process, the object marker 440 marks the valid objects and the invalid objects in the first and second heap spaces 460 and 470. The invalid objects need to be garbage collected. The valid objects need to be kept. In some embodiments, the valid objects in the first heap space 460 may be treated as the data stored in the first heap space 460.

If the second heap space 470 after garbage collection is sufficient to accommodate the data stored in the first heap space 460 (in this case, the space occupied by the invalid objects in the second heap space 470 is larger than the space occupied by the data stored in the first heap space 460), the second collector 430 may perform the garbage collection on the second heap space 470. The garbage collection may employ any appropriate garbage collection policies. After the garbage collection, the second heap space 470 is now sufficient to accommodate the data stored in the first heap space 460. Thereby, the first collector 420 may move the data stored in the first heap space 460 to the second heap space 470.

In some embodiments, the newly allocated object that triggers the object allocation failure may also be considered. In this case, if the second heap space 470 after garbage collection is sufficient to accommodate the data stored in the first heap space 460 and the newly allocated object, the second collector 430 may perform the garbage collection on the second heap space 470.

Figure 6:
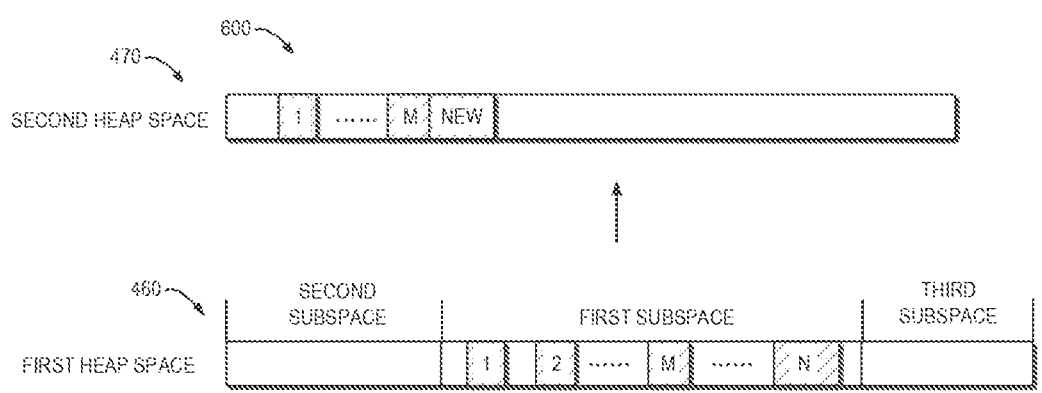
FIG. 6 depicts a schematic diagram of an example of storing data into a second heap space according to an embodiment of the present invention.

FIG. 6 depicts a schematic diagram 600 of an example of storing data into the second heap space 470 according to an embodiment of the present invention. As shown in FIG. 6, the first subspace of the first heap space 460 stores several objects, such as the objects 1-N. After the garbage collection of the second heap space 470, the valid objects in the first heap space 460, such as the objects 1-M, are moved to the second heap space 470. In addition, in some embodiments, the newly allocated object that triggers the object allocation failure may also be stored in the second heap space 470.

In some embodiments, after moving the data stored in the first heap space 460 to the second heap space 470, the first collector 420 may release the first heap space 460 into the native memory 450. In this way, the memory space can be used efficiently, such as in the 32 bit or 64 bit Java Virtual Machine (JVM). The efficiency can be significantly improved especially when the memory space is limited, such as in the 32 bit JVM.

Otherwise, if the second heap space after the garbage collection is not enough to accommodate the data, the scavenger 426 of the first collector 420 may perform garbage collection on the first heap space 460. In some embodiments, in the garbage collection on the first heap space 460, the scavenger 426 may store the data in the first subspace into the second subspace. More specifically, the valid objects in the first subspace may be stored into the second subspace, while the invalid objects are removed or deleted. In this way, the roles of the first and second subspaces are interchanged. The second subspace is now used to store the objects, while the first subspace is used as the spare heap space for garbage collection.

Figure 7:
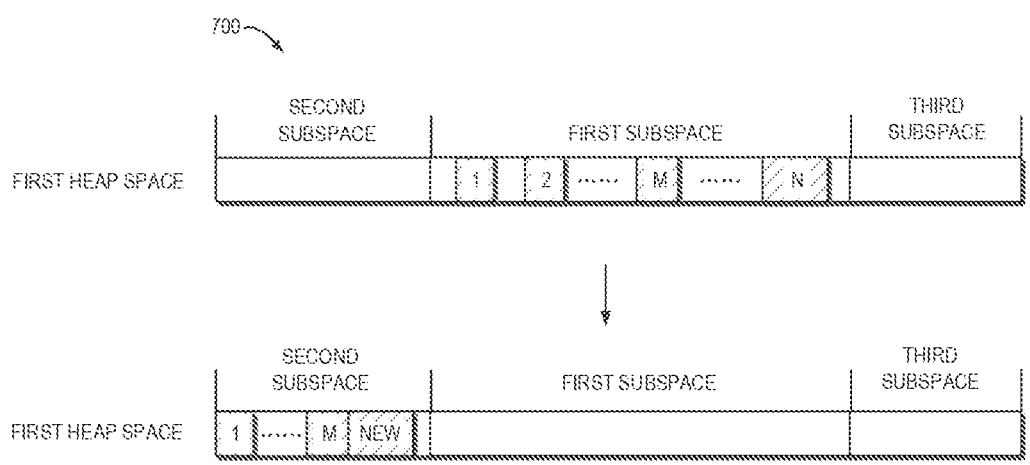
FIG. 7 depicts a schematic diagram of an example of performing garbage collection on a first heap space according to an embodiment of the present invention.

FIG. 7 depicts a schematic diagram of an example of performing garbage collection 700 on the first heap space 460 according to an embodiment of the present invention. As shown in FIG. 7, the first subspace of the first heap space 460 stores several objects, such as the objects 1-N. After the garbage collection of the first heap space 460, the valid objects in the first subspace, such as the objects 1-M, are moved to the second subspace. In addition, in some embodiments, the newly allocated object that triggers the object allocation failure may also be stored in the second subspace. In this way, the garbage collection of the first heap space 460 can be easily performed.

In addition, since the application has requested the extra heap space, the original heap space size may be insufficient for the application. In this case, the max heap space size used by the application may be recorded and used as a suggested heap space size in the future. To this end, in some embodiments, the controller 410 may determine a total amount of storage resources of the second heap space 470 and the first heap space 460. Thereby, the controller 410 may perform further heap space allocation for the application based on the total amount.

Figure 8:
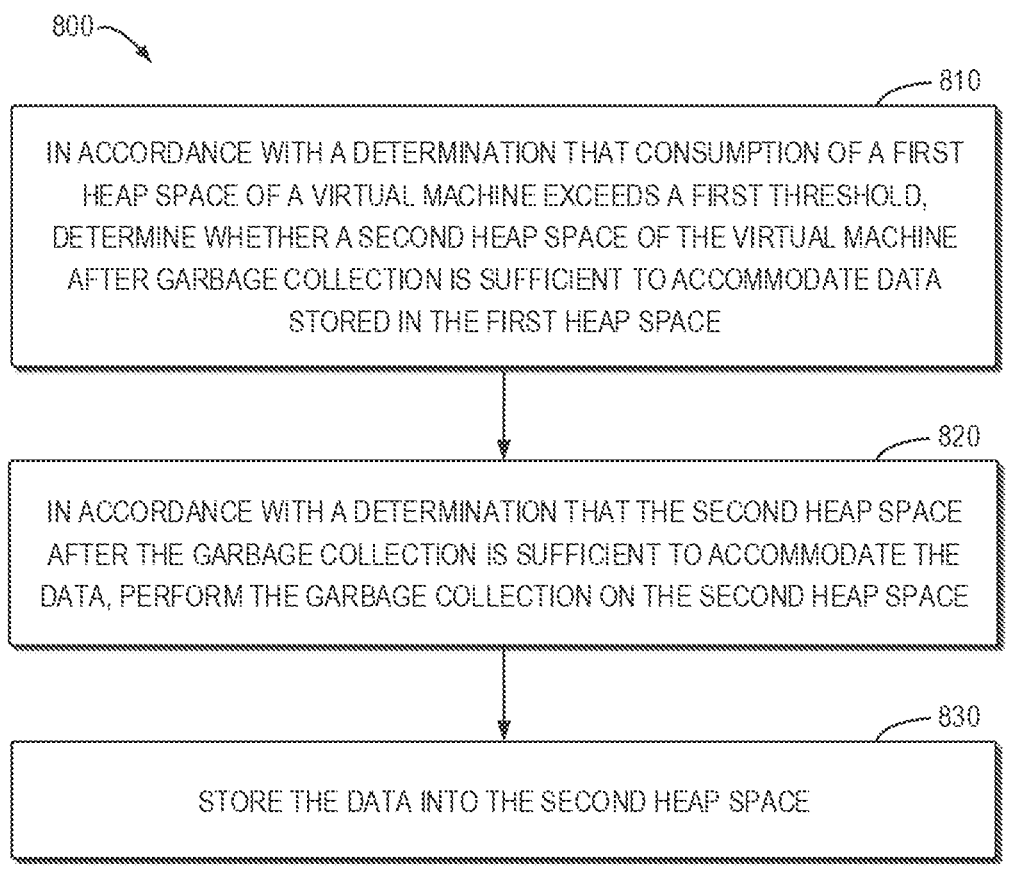
FIG. 8 depicts a flowchart of an example of a method for heap space management according to an embodiment of the present invention.

FIG. 8 depicts a flowchart of an example of a method for heap space management 800 according to an embodiment of the present invention. At operation 810, in response to a determination that consumption of a first heap space of an application exceeds a first threshold, the controller 410 may determine whether a second heap space of the application after garbage collection is sufficient to accommodate data stored in the first heap space.

At operation 820, in response to a determination that the second heap space after the garbage collection is sufficient to accommodate the data, the controller 410 may perform the garbage collection on the second heap space.

At operation 830, the controller 410 may store the data into the second heap space.

In some embodiments, in response to a determination that the second heap space after the garbage collection is not enough to accommodate the data, the controller 410 may perform garbage collection on the first heap space.

In some embodiments, the first heap space may include a first subspace and a second subspace. The data may be stored in the first subspace. In order to perform the garbage collection on the first heap space, the controller 410 may store the data in the first subspace into the second subspace.

In some embodiments, the controller 410 may perform further garbage collection on the second heap space; determine whether consumption of the second heap space after the further garbage collection exceeds a second threshold; and in response to a determination that the consumption of the second heap space of the application exceeds the second threshold, allocate the first heap space for the application.

In some embodiments, in order to allocate the first heap space, in response to a determination that an amount of storage resources being requested for allocation of the first heap space exceeds a threshold amount, the controller 410 may reduce the amount of storage resources; and allocate the reduced amount of storage resources for the first heap space.

In some embodiments, in order to allocate the first heap space, the controller 410 may allocate the first heap space from a native memory.

In some embodiments, the controller 410 may release the first heap space into a native memory.

In some embodiments, the controller 410 may determine a total amount of storage resources of the second heap space and the first heap space; and perform further heap space allocation for the application based on the total amount.

It should be noted that the processing of storage management according to embodiments of this disclosure could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/operations/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/operations/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, operations, or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
in response to a determination that consumption of a first heap space of an application exceeds a first threshold, determining whether a second heap space of the application after garbage collection is sufficient to accommodate data stored in the first heap space;
in response to a determination that the second heap space after the garbage collection is sufficient to accommodate the data, performing the garbage collection on the second heap space; and
storing the data into the second heap space.

2. The method of claim 1, further comprising:
in response to a determination that the second heap space after the garbage collection is not enough to accommodate the data, performing garbage collection on the first heap space.

3. The method of claim 2, wherein:
the first heap space includes a first subspace and a second subspace,
the data is stored in the first subspace, and
performing the garbage collection on the first heap space comprises:
storing the data in the first subspace into the second subspace.

4. The method of claim 1, further comprising:
performing further garbage collection on the second heap space;
determining whether consumption of the second heap space after the further garbage collection exceeds a second threshold; and
in response to a determination that the consumption of the second heap space of the application exceeds the second threshold, allocating the first heap space for the application.

5. The method of claim 4, wherein allocating the first heap space comprises:
in response to a determination that an amount of storage resources being requested for allocation of the first heap space exceeds a threshold amount, reducing the amount of storage resources; and
allocating the reduced amount of storage resources for the first heap space.

6. The method of claim 4, wherein allocating the first heap space comprises:
allocating the first heap space from a native memory.

7. The method of claim 1, further comprising:
releasing the first heap space into a native memory.

8. The method of claim 1, further comprising:
determining a total amount of storage resources of the second heap space and the first heap space; and
performing further heap space allocation for the application based on the total amount.

9. A system, comprising:
a processing unit; and
a memory coupled to the processing unit and storing instructions thereon, the instructions, when executed by the processing unit, performing a method including:
in response to a determination that consumption of a first heap space of an application exceeds a first threshold, determining whether a second heap space of the application after garbage collection is sufficient to accommodate data stored in the first heap space;
in response to a determination that the second heap space after the garbage collection is sufficient to accommodate the data, performing the garbage collection on the second heap space; and
storing the data into the second heap space.

10. The system of claim 9, wherein the method further comprises:
in response to a determination that the second heap space after the garbage collection is not enough to accommodate the data, performing garbage collection on the first heap space.

11. The system of claim 10, wherein:
the first heap space includes a first subspace and a second subspace,
the data is stored in the first subspace, and
performing the garbage collection on the first heap space comprises:
storing the data in the first subspace into the second subspace.

12. The system of claim 9, wherein the method further comprises:
performing further garbage collection on the second heap space;
determining whether consumption of the second heap space after the further garbage collection exceeds a second threshold; and
in response to a determination that the consumption of the second heap space of the application exceeds the second threshold, allocating the first heap space for the application.

13. The system of claim 12, wherein allocating the first heap space comprises:
in response to a determination that an amount of storage resources being requested for allocation of the first heap space exceeds a threshold amount, reducing the amount of storage resources; and
allocating the reduced amount of storage resources for the first heap space.

14. The system of claim 12, wherein allocating the first heap space comprises:
allocating the first heap space from a native memory.

15. The system of claim 9, wherein the method further comprises:
releasing the first heap space into a native memory.

16. The system of claim 9, wherein the method further comprises:
determining a total amount of storage resources of the second heap space and the first heap space; and
performing further heap space allocation for the application based on the total amount.

17. A computer program product, comprising a computer-readable storage medium having program instructions embodied therewith, the program instructions executable by a processor to cause the processor to perform a method including:
in response to a determination that consumption of a first heap space of an application exceeds a first threshold, determining whether a second heap space of the application after garbage collection is sufficient to accommodate data stored in the first heap space;

in response to a determination that the second heap space after the garbage collection is sufficient to accommodate the data, performing the garbage collection on the second heap space; and storing the data into the second heap space.

18. The computer program product of claim 17, wherein the method further comprises:

in response to a determination that the second heap space after the garbage collection is not enough to accommodate the data, performing garbage collection on the first heap space.

19. The computer program product of claim 18, wherein the first heap space includes a first subspace and a second subspace, the data is stored in the first subspace, and performing the garbage collection on the first heap space comprises:

storing the data in the first subspace into the second subspace.

20. The computer program product of claim 17, wherein the method further comprises:

performing further garbage collection on the second heap space;

determining whether consumption of the second heap space after the further garbage collection exceeds a second threshold; and in response to a determination that the consumption of the second heap space of the application exceeds the second threshold, allocating the first heap space for the application.

* * * * *